Feb. 8, 1944. J. L. AASLAND 2,341,170
CLUTCH
Filed Jan. 26, 1942 2 Sheets-Sheet 1

Inventor:
John L. Aasland,
By Paul O. Pippel
Atty.

Feb. 8, 1944. J. L. AASLAND 2,341,170
CLUTCH
Filed Jan. 26, 1942 2 Sheets-Sheet 2
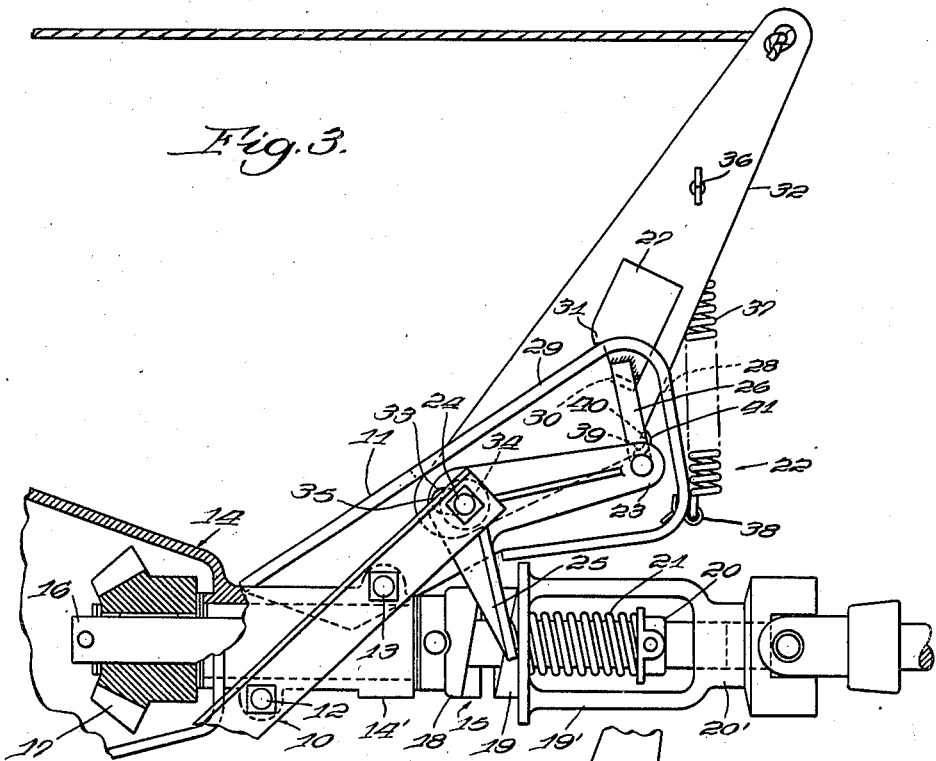
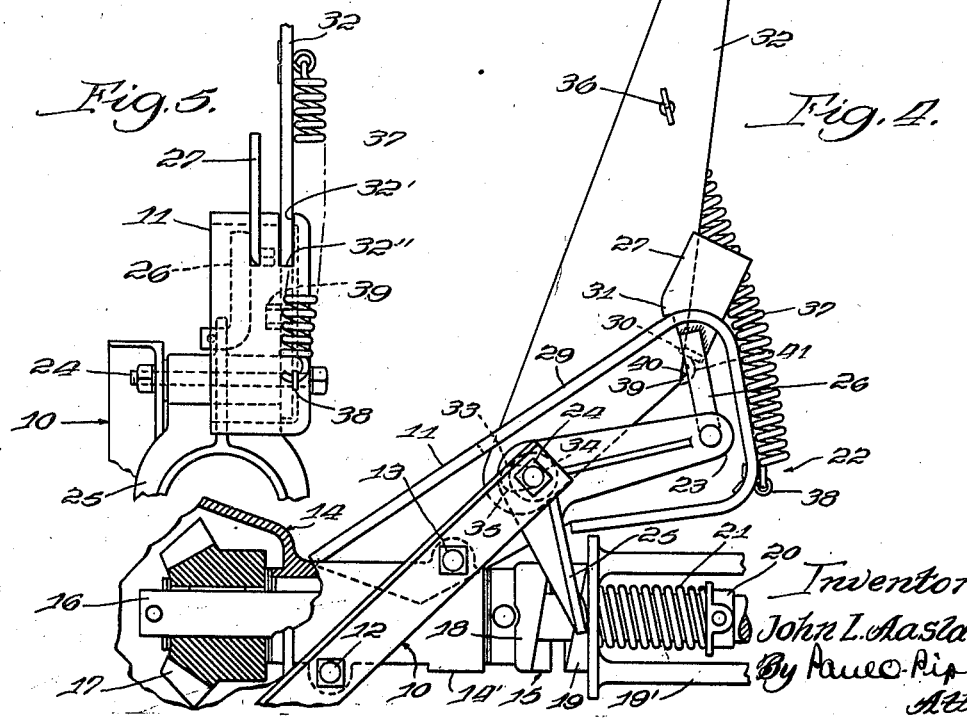
Inventor:
John L. Aasland
By Paul O. Pippel
Atty.

Patented Feb. 8, 1944

2,341,170

UNITED STATES PATENT OFFICE 2,341,170

CLUTCH

John L. Aasland, Moline, Ill., assignor to International Harvester Company, a corporation of New Jersey Application January 26, 1942, Serial No. 428,230

10 Claims. (Cl. 192—92)

This invention relates to a clutch and more particularly to a shifting mechanism for a clutch.

The invention contemplates and has for its principal object the provision of an improved means for engaging and disengaging a clutch.

Another object of the invention is to provide an improved means for holding a clutch out of engagement.

A still further object is to provide an improved means for moving a clutch out of a disengaging position.

According to the present invention, a clutch is mounted upon a fixed support and comprises a driving and a driven element. Means for shifting the driving and driven elements is provided in the form of a clutch-shifting element mounted for pivotal movement upon a fixed support. A link is pivotally connected to the clutch-shifting element and is provided with a latch adapted to cooperate with a portion of the support for holding the clutch-shifting element in a clutch-disengaging position. An actuating member in the form of a lever is pivotally mounted on the support, said lever having a portion adapted to engage the clutch-shifting element for moving the same into its clutch-disengaging position. Means is also provided on the lever for returning the clutch-shifting element to its clutch-engaging position.

For a more complete understanding of the invention and for other objects and advantages of the invention, reference may be had to the following detailed description taken in conjunction with the accompanying sheets of drawings, in which:

Figure 3 is a side elevational view of a clutch and clutch-disengaging means showing the clutch locked out of engagement;

Figure 4 is a side elevational view of the clutch and clutch-disengaging means showing the clutch about to be released to its clutch-engaging position; and Figure 5 is a rear view of a portion of the clutch-disengaging means.

Figure 1:
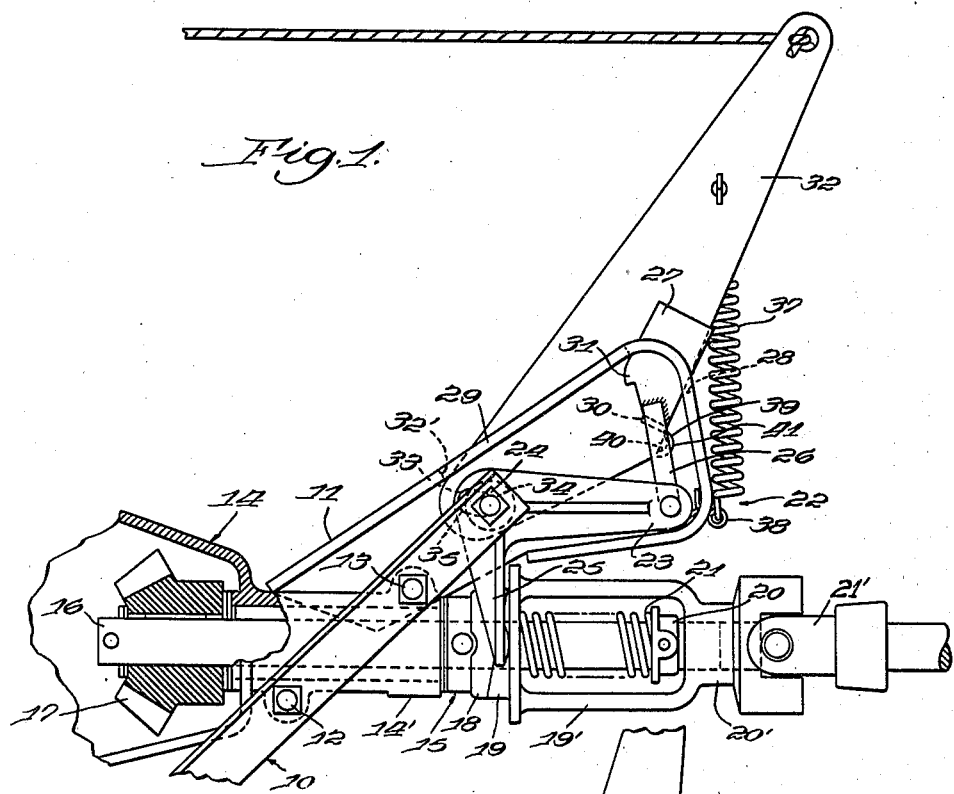
Figure 1 is a side elevational view of a clutch and clutch-disengaging means showing the clutch in its normally engaged driving position.

A clutch-supporting structure, generally designated at 10, is provided with a flanged plate member 11 connected to the structure 10 by fastening means in the form of bolts 12 and 13. A housing 14 having a tubular extension 14' is connected to the supporting structure 10 by the bolts 12 and 13 and supports a clutch, generally designated at 15. The clutch 15 includes a shaft 16 mounted for rotation in the housing extension 14', the shaft having a driving gear 17 fixedly mounted thereon in the housing 14. The clutch 15 includes a driving element 18 fixedly carried on the shaft 16 for rotation therewith. The element 18 engages a driven element 19 rotatably carried on the shaft 16. For keeping the driven element 19 in engagement with the element 18, there is provided a collar 20 fixedly mounted on the shaft 16, said collar holding a resilient means in the form of a spring 21 against a portion of the driven element 19 to keep said element in engagement with the driving element 18. The driven element 19 includes extensions 19' which carry a bearing member 20' journaled on the shaft 16. A power take-off member 21' is connected to the bearing 20' for rotation with the driven member 19.

A clutch-disengaging means is generally designated at 22 and includes a clutch-shifting element which may be in the form of a bell-crank 23 pivotally mounted on the supporting structure 10 and the flanged plate member 11. The clutch-shifting element 23 is provided with a fork 25 for engaging the driven element 19. At one end of the element 23 there is pivotally connected a link 26 which is kept in a substantially vertical position with respect to the clutch-shifting element 23 by means of a latch 27 rigidly fastened to the link 26, said latch extending through a slot 28 formed in a flange 29 on the plate member 11. The latch 27 is provided with a projecting portion 30 extending transversely of the link 26. The latch 27 is also formed with a hook portion 31, adapted to cooperate with the end of the slot 28 formed in the flange 29 of the plate member 11, upon pivotal movement of the clutch-shifting element 23 into one position. Means for actuating the clutch-shifting element 23 is provided in the form of a lever 32 pivotally connected to the supporting structure 10 by means of a bolt 24. The lever 32 is pivotally movable in a slot 32' in the flange 29 of the plate member 11 and is provided with a slot 33 for allowing bodily shifting of the lever 32 from a first pivot point 34 to a second pivot point, as designated at 35. Connected to the lever 32 at 36 is a resilient means in the form of a spring 37 which is connected at 38 to the flange 29 of the plate member 11, said spring serving to hold the lever 32 against a portion 32" formed by the slot 32' in the flange 29, as best shown in Figure 5, and also serving to hold the lever in its first pivotal position 34. A lifting projection which may be in the form of a semi-circular portion 39 is rigidly secured to the lever 32 and extends transversely thereof, said portion 39 including a recess 40 and a cam portion 41. The recess 40 of the lifting projection 39 is adapted to engage the projecting portion 30 of the latch 27 upon movement of the lever 32, thereby imparting movement to the clutch-shifting member 23.

Figure 2:
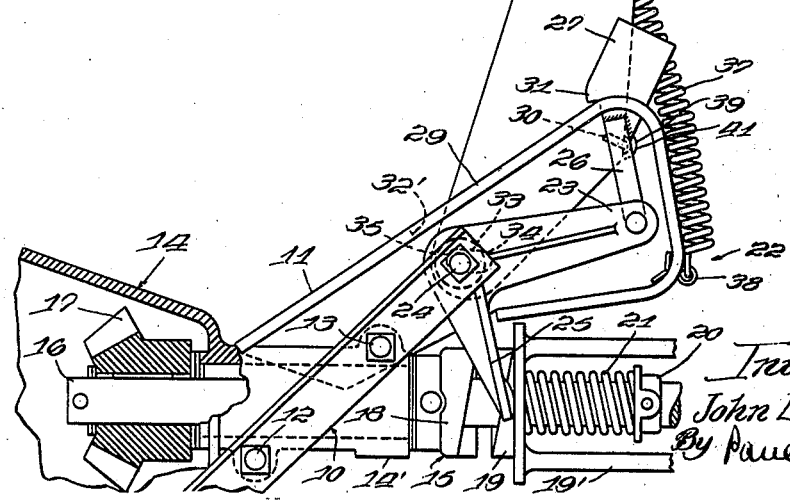
Figure 2 is a side elevational view of a clutch and clutch-disengaging means showing the clutch in a disengaging position.

In operation for disengaging the clutch from a position as shown in Figure 1, the lever 32 is rotated about its pivot point 34 until the recessed portion of the lifting projection 39 engages the projection 30 on the latch 27, thus imparting pivotal movement to the clutch-shifting member 23 and causing disengagement of the driven means 19 with respect to the driving element 18. As best shown in Figure 2, continued movement of the lever 32 will cause the latch 27 to slide in the slotted portion 28 until the hooked portion 31, on the latch 27, cooperates with an end portion of the slot 28, thus holding the clutch-shifting element 23 in clutch-disengaging position. The continued movement of the lever 32 and the movement of the clutch-shifting element 23 to its locking position will cause the lever 32, by virtue of its slotted pivotal connection 33, to bodily shift to the second pivot point 35 as best shown in Figure 2. The lever 32 is then returned to its first pivotal point 34 by means of the spring 37 which also operates to return said lever to its starting position against the portion 32" in the slot 32', as best shown in Figures 3 and 5.

For reengaging the driven element 19 with the driving element 18, the lever 32 is moved in the same direction as that used for disengaging the clutch. The lever 32 pivots about its first pivot point 34 until the lifting projection 39 engages the projecting portion 30 on the lever 27, as best shown in Figure 4. Because of the fact that the lever 32 is pivoting about its first pivot point 34, the outer cam portion 41 of the member 39 engages the projection 30, rather than the recess 40 which was previously used for engaging the projection 30 during disengaging of the clutch. At this point, continued movement of the member 32 will cause the cam 41 to unhook the latch 27 from its position in the slot 28, and the latch 27 is free to slide through said slot 28, thereby releasing the clutch-shifting element 23 from its disengaging position, allowing the spring 21 to return the driven element 19 into its engaging position with the driving element 18. It will be noted that the spring 37 operates to keep the lever 32 in its first pivotal position 34, and it is only during movement of the clutch-shifting element 23 to its disengaging position that the lever 32 moves to its second pivot point 35.

It will be understood, of course, that only a preferred embodiment of the invention has been illustrated and described and that numerous modifications and alterations may be made therein without departing from the spirit and scope of the present invention as defined by the appended claims.

What is claimed is:

1. The combination with a clutch, of means for disengaging the clutch comprising a support, a manually operable lever having a slotted pivotal connection with the support so as to be bodily shiftable with respect to its pivot point on the support, a clutch-releasing bell-crank pivoted on the support, a link connected to the bell-crank and having a hook portion adapted to cooperate with a portion of the support to hold the bell-crank in clutch-releasing position, a lifting projection on the link, a recessed projection on the lever engageable with the lifting projection on the link upon pivoting of the lever so as to cause bodily shifting of the lever with respect to the pivot point and engagement of the hook portion of the link with the support, and cam means on the lever for contacting the link upon movement of the lever thereby releasing the hook portion from the support to permit engagement of the clutch.

2. The combination with a clutch, of means for disengaging the clutch comprising a support, a member having a slotted pivotal connection with the support so as to be bodily shiftable with respect to its pivot point on the support, an element pivotally mounted on the support and connected with the clutch for engaging and releasing said clutch, a latch connected to the element adapted to cooperate with the support for holding the clutch out of engagement, a projection on the latch, a recessed projection on the member adapted to engage the projection on the latch upon pivoting of the member to cause bodily shifting of the member with respect to the pivot point and causing engagement of the latch with the support, and means on the member for contacting the latch upon movement of the member thereby releasing the latch from the support to permit engagement of the clutch.

3. The combination with a clutch, of means for disengaging the clutch comprising a support, a member having a slotted pivotal connection with the support so as to be bodily shiftable from a first pivot point to a second pivot point, an element pivotally mounted on the support and connected to the clutch for engaging and releasing said clutch, a latch means connected to the element for cooperating with a portion of the support to hold the clutch out of engagement, said latch means having a projecting portion, a lifting projection on the member for engaging the projecting portion of the latch upon movement of the member thereby causing the member to bodily shift to its second pivot point until the latch cooperates with a portion of the support to hold the clutch out of engagement, means for returning the member to its first pivot point, and cam means on the member adapted to contact the projecting portion on the latch means during pivotal movement of the member about its first pivot point thereby causing movement of the latch means out of cooperation with the support and thereby permitting engagement of the clutch.

4. The combination with a clutch, of means for disengaging the clutch comprising a support, a member having a slotted pivotal connection with the support so as to be bodily shiftable with respect to its pivot point on the support, said member having a projecting portion thereon, a clutch-shifting element pivotally mounted on the support for shifting the clutch into an engaging or disengaging position, a locking means connected to the element and adapted to cooperate with the support to hold the clutch in the disengaging position, a projection on the element for engaging the projection on the member upon movement of the member, said movement causing the element to move to its clutch-disengaging position and bodily shifting the member with respect to its pivot point on the support, resilient means for returning the member to its pivot point, and means on the member for unlocking the element to return the element to its clutch-engaging position upon movement of the member about its pivot point.

5. For a clutch having engageable and disengageable parts: a support; a control member; pivot means connecting the control member to the support and including a slotted connection providing for shifting of the pivot point to mount the control member for swinging movement with respect to the support about first and second spaced axes; a clutch operating release element for disengaging the clutch parts; actuating means operable by swinging of the control member about the first pivot axis and engageable with the release element to disengage the clutch parts, said pivot point being shiftable to the second pivot axis upon continued movement of the control member; latch means for locking the release element in position with the clutch parts disengaged; said latch means being engageable by the actuating means upon continued movement of the member for locking the release element; means for returning the member to starting position and the pivot point to its first pivot axis, subsequent swinging of said member causing engagement of the actuating means with the latch means for unlocking said latch means to release the clutch operating element.

6. The combination with a clutch, of means for disengaging the clutch comprising a support, a member having a slotted pivotal connection with the support to be bodily shiftable with respect to the support and pivotable about either of two pivot axes, a clutch-releasing element connected to the support for movement to and from a clutch-releasing position, said element having a lifting projection thereon and latch means adapted to cooperate with the support for holding the element in clutch-releasing position, a projecting portion on the member adapted to engage the lifting projection on the element upon movement of the member about one axis whereupon continued movement of the member and the releasing element will cause shifting of the member to a second pivot axis and said latch means will cooperate with the support to hold the element in its clutch-releasing position, and means for returning the member to its first pivot axis whereupon movement of the member around said axis will move the element from its clutch-releasing position.

7. In an assembly comprising a clutch, a movable holding part connected with the clutch, a stationary holding part adapted to be engaged by the movable holding part in an extreme position for holding the clutch disengaged, and an actuator, the combination with the actuator, of means for causing movement of the actuator in a certain direction to disengage the clutch and movement in the same direction to reengage the clutch, said means comprising cam means associated with the actuator, cam means associated with the movable holding part, a support, and means forming a pivotal and shifting mounting of the actuator on the support for causing movement of the actuator in the said certain direction with the clutch engaged immediately to produce engagement of the cam means associated with the actuator and with the movable holding part and thereby to shift the actuator with respect to the support to cause the movable holding part to engage the stationary holding part for holding the clutch disengaged, and for causing another movement of the actuator in the said certain direction with the holding parts engaged and the clutch disengaged first to pivot with respect to the support and then to produce engagement of the cam means associated with the actuator and with the movable holding part to disengage the holding parts for reengagement of the clutch.

8. In an assembly comprising a clutch, a movable holding part connected with the clutch, a stationary holding part adapted to be engaged by the movable holding part in an extreme position for holding the clutch disengaged, and an actuator, the combination with the actuator, of means for causing movement of the actuator in a certain direction to disengage the clutch and movement in the same direction to reengage the clutch, said means comprising cam means associated with the actuator, cam means associated with the movable holding part, a support, and means forming a pivotal and shifting mounting of the actuator on the support for causing movement of the actuator in the said certain direction with the clutch engaged immediately to produce engagement of one portion of the cam means associated with the actuator and of the cam means associated with the movable holding part and thereby to shaft the actuator with respect to the support to cause the movable holding part to engage the stationary holding part for holding the clutch disengaged, and for causing another movement of the actuator in the said certain direction with the holding parts engaged and the clutch disengaged first to pivot with respect to the support and then to produce engagement of another portion of the cam means associated with the actuator and of the cam means associated with the movable holding part to disengage the holding parts for reengagement of the clutch.

9. In an assembly comprising a clutch, a movable holding part connected with the clutch, a stationary holding part adapted to be engaged by the movable holding part in an extreme position for holding the clutch disengaged, and an actuator, the combination with the actuator, of means for causing movement of the actuator in a certain direction to disengage the clutch and movement in the same direction to reengage the clutch, said means comprising cam means associated with the actuator and having a recessed portion, cam means associated with the movable holding part, a support, and means movably mounting the actuator on the support for causing movement of the actuator in the said certain direction with the clutch engaged to produce engagement between the recessed portion of the cam means associated with the actuator and thereby to move the movable holding part into engagement with the stationary holding part for holding the clutch disengaged, and for causing another movement in the said certain direction with the holding parts engaged and the clutch disengaged to produce engagement of another portion of the cam means associated with the actuator and the cam means associated with the movable holding part to disengage the holding parts for reengagement of the clutch.

10. In an assembly comprising a clutch, a movable holding part connected with the clutch, a stationary holding part adapted to be engaged by the movable holding part in an extreme position for holding the clutch disengaged, and an actuator, the combination with the actuator, of means for causing movement of the actuator in a certain direction to disengage the clutch and movement in the same direction to reengage the clutch, said means comprising cam means associated with the actuator and having a recessed portion, cam means associated with the movable holding part, a support, and means pivotally and shiftably mounting the actuator on the support for causing movement of the actuator in the said certain direction with the clutch engaged immediately to produce engagement between the recessed portion of the cam means associated with the actuator and thereby to shift the actuator with respect to the support to move the movable holding part into engagement with the stationary holding part for holding the clutch disengaged, and for causing another movement in the said certain direction with the holding parts engaged and the clutch disengaged first to pivot with respect to the support and then to produce engagement of another portion of the cam means associated with the actuator and the cam means associated with the movable holding part to disengage the holding parts for reengagement of the clutch.

JOHN L. AASLAND.